J. A. ESCO.
SHAFT HANGER.
APPLICATION FILED JAN. 21, 1909.
935,593.
Patented Sept. 28, 1909.
2 SHEETS—SHEET 1.
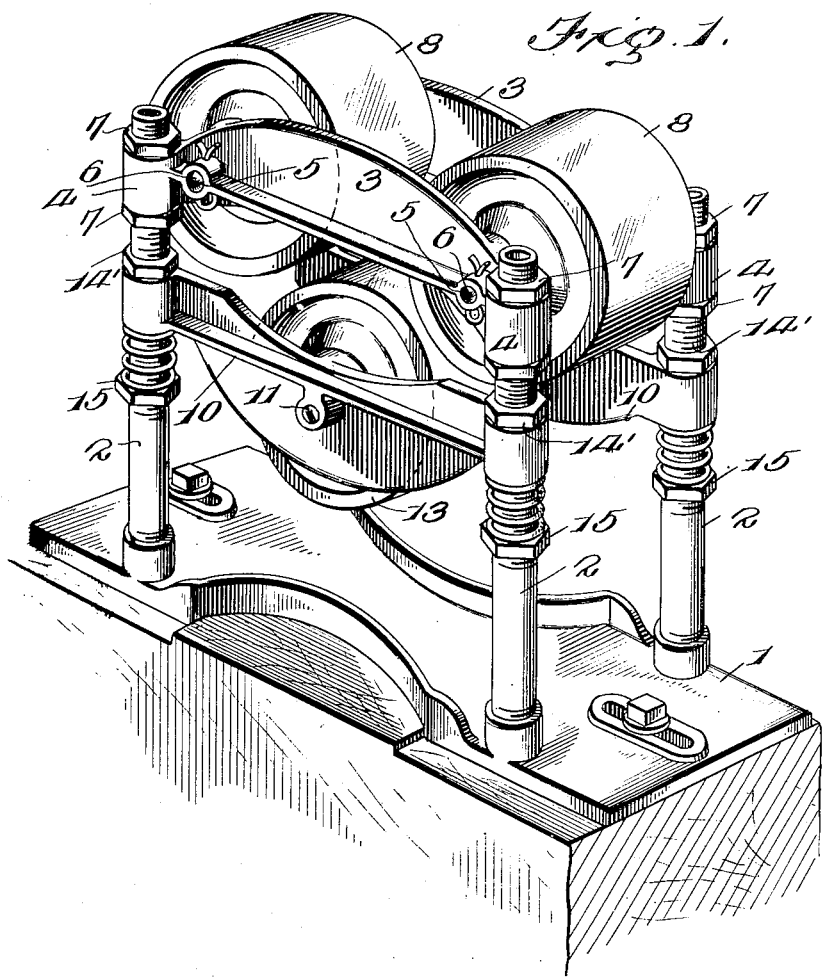
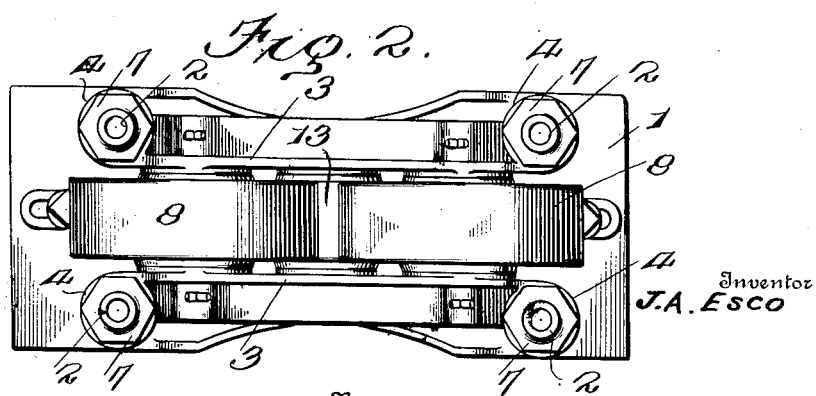
Witnesses
Inventor
J. A. ESCO
By
Attorney

UNITED STATES PATENT OFFICE.

JOSEPH ALEXANDER ESCO, OF STONE MOUNTAIN, GEORGIA, ASSIGNOR TO ALBERT KATER JONES AND JOHN TYLER FREEMAN, OF INGLESIDE, GEORGIA.

SHAFT-HANGER.

935,593.  Specification of Letters Patent.  Patented Sept. 28, 1909.

Application filed January 21, 1909. Serial No. 473,442.

*To all whom it may concern:*

Be it known that I, JOSEPH ALEXANDER ESCO, a citizen of the United States, residing at Stone Mountain, in the county of Dekalb and State of Georgia, have invented certain new and useful Improvements in Shaft-Hangers, of which the following is a specification.

This invention relates to improvements in an adjustable anti-friction bearing for shafts.

The object of the invention is to provide in a bearing an adjustably mounted bearing roller, traveling on anti-friction devices to reduce the friction of the parts to a minimum.

The invention also relates to the specific details of construction and arrangement of parts, all of which will be hereinafter referred to and particularly pointed out in the claims.

Figure 3:
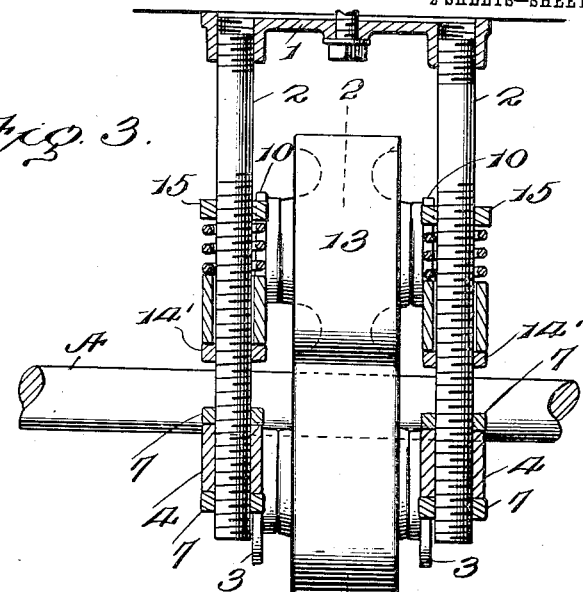
Figure 4:
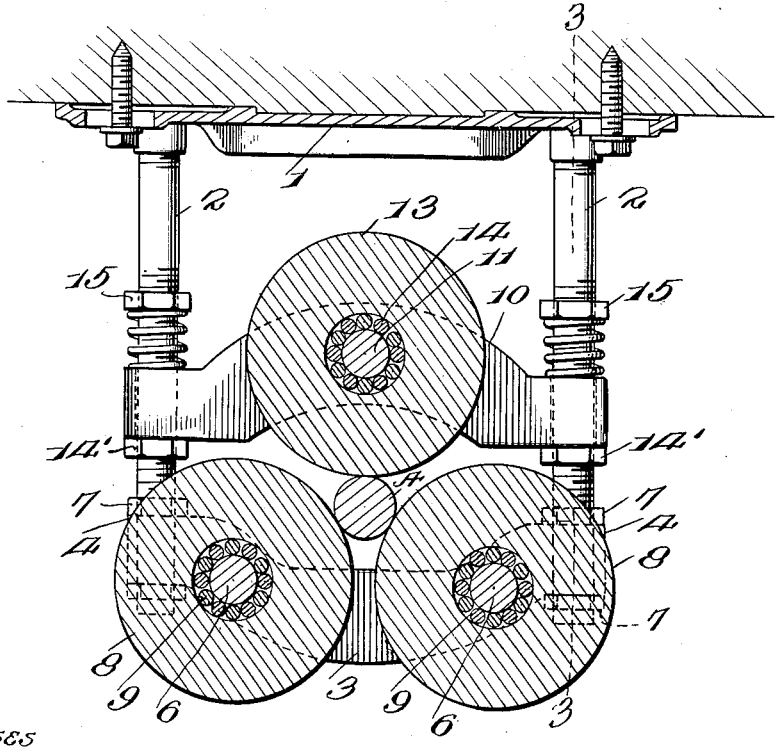

In the drawings:—Figure 1, is a perspective view of the improved bearing. Fig. 2, is a top plan view. Fig. 3, is a transverse section on the line 3—3 Fig. 4. Fig. 4, is a vertical section on the line 2—2 Fig. 3.

The numeral 1, indicates a support, provided with four parts 2—2—2—2, threaded at their free ends. The posts carry at their outer ends what may be termed a stationary frame 3, comprising two side bars having perforated ears 4, to engage the posts, and registering openings 5—5, for transverse shafts 6—6. The ears are retained in position on the posts by upper and lower lock nuts 7—7, which permit of adjustment as will be obvious from the drawings. The shafts 6—6 are held in the side bars of the stationary frame, by cotter pins. On these shafts are mounted rollers 8—8, and interposed between said shafts and rollers are anti-friction rollers 9. The upper stationary frame may be adjusted on the posts, the two shafts serving to connect the side bars to cause the frame to move evenly up and down on said posts.

10 indicates an adjustable frame, comprising two side bars connected by a transverse shaft 11, each said side bar having a perforated ear at its outer end, adapted to slide freely over the posts 2. Mounted on the shaft 11, is a roller 13, between which and the shaft 11, are anti-friction rollers 14. The movement of the movable frame 10, is limited toward the two rollers 8—8, by lock nuts 14', 14', engaging the threaded portion of the posts, and are held in this position by coiled springs interposed between the ears and adjusting nuts 15—15.

As shown in the drawing the bearing is adapted to be used as positioned in Fig. 1, or as shown in Figs. 3, and 4. It is therefore capable of use on a bed, or suspended from the ceiling.

A shaft A is supported between the peripheries of the rollers 8, and 13, and as said rollers all revolve on anti-friction rollers, the friction between the parts is greatly reduced. The fact that the rollers are free to revolve when the shaft revolves tends to reduce the friction, but as the anti-friction rollers also revovle between their bearing surfaces, it is evident all parts move as free as possible. If then there is any variation in the revolution of the shaft A., or for any reason a sudden lateral movement be imparted to said shaft, the lower movable frame 10, immediately yields sufficiently to prevent breakage or undue strain on the parts.

The stationary and movable frame can be readily moved up or down on the posts to properly center the shaft A, by simply releasing the lock nuts, and moving said frames accordingly. The shaft A having been centered the lock nuts are again tightened against the ears of the frames and the openings placed under the required tension.

The invention is simple and may be made to withstand great strain and by the specific arrangement of parts, friction is reduced to a minimum.

What I claim as new is:—

1. A shaft hanger comprising a support including threaded posts, a frame formed with ears which engage the posts, locking nuts on the posts and engaging the ears to position the frame and, hold the same rigid with the posts, shafts connecting the frame, rollers mounted on the shafts, anti-friction devices between the rollers and shafts, a movable frame having ears which engage the posts, locking nuts on the posts for limiting the movement of the said frame toward the stationary frame, and springs normally engaging the movable frame to force the same toward the stationary frame.

2. A shaft hanger comprising posts, a stationary frame having ears which engage the posts, means for holding the frame on the posts, a movable frame having ears which engage the means for limiting the movement of the movable frame in one direction, springs for normally forcing the frame toward said limiting means, and spaced apart rollers mounted in the stationary and movable frames, the space between the rollers forming a shaft opening, the springs serve to cause the rollers in both said frames to engage a shaft passing between them.

3. A shaft hanger comprising threaded posts, two frames mounted on the posts, means for yieldingly mounting one of the frames, means for adjusting the frames, spaced apart rollers supported by the frames, the space between the rollers forming a shaft opening, and the yielding frame causing the rollers of the frame to engage a shaft fitted in the shaft opening.

4. A shaft hanger comprising four posts, a fixed frame including two side bars provided with ears and two shafts connecting the side bars, the ears engaging the posts, nuts on the posts for positioning the frame, anti-friction rollers on the shafts, a movable frame including two side bars having ears and connected by a shaft, the ears engaging the posts, nuts on the posts for limiting the movement of the removable frame in one direction, other nuts on the posts, springs on the posts between the last mentioned nuts and the ears to permit movement of the movable frame, and an anti-friction roller mounted on the shaft and spaced from the two aforesaid anti-friction rollers, the space between the rollers forming a shaft opening.

In testimony whereof I affix my signature in presence of two witnesses.

JOSEPH ALEXANDER ESCO.

Witnesses:
J. P. LONDERGAN,
J. R. RIVERS.